United States Patent
Lu et al.

(10) Patent No.: US 7,715,479 B2
(45) Date of Patent: May 11, 2010

(54) POWER-AWARE ON-CHIP MEMORY MANAGEMENT FOR VIDEO CODING ALGORITHMS

(75) Inventors: Ligang Lu, Somers, NY (US); Krishna C Ratakonda, Yorktown, NY (US); Vadim Sheinin, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 1360 days.

(21) Appl. No.: 10/624,428

(22) Filed: Jul. 21, 2003

(65) Prior Publication Data

US 2005/0018909 A1 Jan. 27, 2005

(51) Int. Cl.
*H04N 7/12* (2006.01)
*H04N 11/02* (2006.01)
*H04N 11/04* (2006.01)

(52) U.S. Cl. .......................... 375/240.16; 375/240.01; 375/240.03; 375/240.12

(58) Field of Classification Search ................. 375/240, 375/240.01, 240.25, 240.03, 240.12, 240.16
See application file for complete search history.

(56) References Cited

U.S. PATENT DOCUMENTS

| 5,576,767 | A | * | 11/1996 | Lee et al. | 375/240.14 |
| 5,675,387 | A | * | 10/1997 | Hoogenboom et al. | 375/240.15 |
| 5,978,509 | A | | 11/1999 | Nachtergaele et al. | 382/236 |
| 6,310,921 | B1 | * | 10/2001 | Yoshioka et al. | 375/240.26 |
| 6,983,020 | B2 | * | 1/2006 | Christiansen | 375/240.16 |
| 2004/0190614 | A1 | * | 9/2004 | Schlockermann et al. | 375/240.12 |

* cited by examiner

*Primary Examiner*—Marsha D Banks Harold
*Assistant Examiner*—Chikaodili E Anyikire
(74) *Attorney, Agent, or Firm*—Ohlandt, Greeley, Ruggiero & Perle, L.L.P.; Daniel P. Morris, Esq.

(57) ABSTRACT

A decoding power aware encoding method for generating a predictively encoded data stream, in which predictions, that result in a reduction in the amount of data transferred from the secondary memory to primary memory during the decoding process, are favored, said method for favoring certain predictions comprising: a model for transfer of data from secondary memory to primary memory in the decoding process; a scheme for weighting the relative merits of favoring a certain prediction and the associated loss in compression gain; and based on said weighting scheme, choosing a particular prediction from the candidates allowed by the compression scheme.

3 Claims, 7 Drawing Sheets

| Macroblock address | Currently in the memory? | Where in video Memory? |
|---|---|---|
|  |  |  |
|  |  |  |
|  |  |  |
|  |  |  |

POWER-AWARE ON-CHIP MEMORY MANAGEMENT FOR VIDEO CODING ALGORITHMS

FIELD OF THE INVENTION

The present invention is in the field of telecommunications, and is more specifically directed to the compression and decompression of video signals. In particular, this invention addresses engineering problems of the existing compression schemes when implemented for mobile platforms, such as smart phones, PDAs, DVD players, etc.

BACKGROUND

Standard video decompression algorithms, such as MPEG-2, MPEG-4, H.263 use a temporal prediction scheme, which is explained below. One common feature of these schemes is a big external memory for storing video frames at different levels of decoding. Actual platforms to run various decoding algorithms vary from standard CPUs to dedicated hardware as well as various combinations of the above. Whether the decompression scheme implementation is based on a standard CPU or a dedicated hardware solution, the price of accessing external memory is heavy in terms of both real-time and system power. Both these characteristics are very important for modern communication systems. The complexity of multimedia algorithms increases from generation to generation. For example, the newest video decoding algorithm H.264 also known as MPEG-4 Part-10) is three time more complex than "initial" MPEG-4 Part-2. Although video quality is by far superior in H.264 case, there are very serious problems in implementing this algorithm on existing platforms, whether it be a standard CPU or dedicated hardware. There is not enough real-time performance to address growing demand for resolution, frame rates and lower bandwidth. In order to increase the real-time performance of such platforms frequency of processing can be increased but it causes higher dissipated power and higher cost of the silicon. Many of such multimedia platforms such as smart phones, PDAs, etc. are very cost sensitive; hence other performance improvement ways should be explored. Additionally, power dissipation is very important for all mobile applications, because battery life is limited and there is little added value in having a multimedia enabled PDA that is capable of playing back a multimedia clip only for few minutes. The requirements are around two hours, which is an average trip time in a train, car etc.

It is conventional practice to provide a caching scheme for video decoding to reduce power dissipation and real-time. But this scheme proposes only very specific, narrow kind of video processing to be run using internal cache. Additionally, if such cache is used by other tasks running on CPU simultaneously with video decoding, it will be contaminated by other kinds of data and the whole advantage of power and real time savings is eliminated.

Having described the above constraints for the decompression part of the video signal processing, we need to point out that there are no platform-based constraints on the compression part of it. Usually, the input material, being an advertisement, entertainment clip, etc, is compressed off-line ahead of time and just distributed to various mobile platforms. Besides producing a particular standard compliant output bitstream there are no "implementation" limitations for an encoder. It will be natural to ask whether it is possible to address decoding platform constraints during actual encoding. It is true that having additional constraints may cause quality degradation of the compression. But what if such quality decrease is very little whereas decoder side advantages are high? Unfortunately, there are no methods in the prior art that would describe decoder-platform-constrained encoding of video signals.

A temporal prediction scheme, which is common for various compression algorithms of video signals, is based on the idea that the current frame of video data being decoded is predicted from previously decoded frames. The frames from which such prediction is formed are called reference frames. In the natural display order, reference frames can either temporally precede/succeed the frame being decoded. Furthermore, most standard video decompression algorithms use a block-based prediction structure, wherein the prediction for each block of video data is formed from a corresponding block of data from a reference frame as indicated by a motion vector. In a typical video decompression system, reference frames are too large to be fully accommodated in the primary (typically on-chip) memory. So, the process of forming the prediction involves:

Moving blocks of data from the secondary (typically off-chip, external) reference frame memory to the primary (typically on-chip) memory;

Performing simple averaging and/or filtering operations on the block of data; and Writing the predicted block back to a secondary memory.

For example, in the case of the MPEG-2 compression standard, each forward-predicted 16×16 block encoded in the frame mode needs a 17×17 block from the reference frame memory to form a suitable prediction. In the average case, it is seen that some blocks of the reference frames are used multiple times in the process of prediction and other blocks are not used at all.

Referring to FIG. 1 the operation of a conventional video decoding system in receiving and decoding compressed video information, according to the MPEG-4 standard, will now be described by way of further background. As is fundamental in the art, MPEG-4 video decoding predicts motion from frame to frame in a video sequence by way of motion vectors, which are two-dimensional vectors that provide offsets from the coordinate position from a prior, reference frame (or/and future, reference frame) to coordinates in the frame currently being decoded. The redundant, or non-moving, information from frame-to-frame is encoded by way of a transform, in this case discrete cosine transform (DCT), the inverse of which is performed by the video decoding system. The inverse transform of the redundant portion of the transmitted frame, in combination with the results of the motion vectors, produces an output frame.

According to the MPEG-4 standard, an incoming bitstream is demultiplexed in block 10, whereas decoding of motion vectors takes place in block 11 and decoding of texture is in block 14. Decoded motion vectors from block 11 are fed to Motion Compensation block 12 where needed block of information is extracted from previous reconstructed frames— block 13— according to the decoded motion vectors. Block 13 requires a big amount of memory to store reconstructed frames, which is generally implemented by means of external memory. It is impossible to keep all this huge memory inside any reasonable chip.

The actual displayable frame reconstruction takes place in block 15 where the output results of block 12 and block 14 are added with appropriate clipping.

In FIG. 1 the operation of texture decoding performed in block 14, which is firstly comprised of variable length decoding performed in block 21. The output of block 21 is fed to Inverse Scan block 22; and from block 22 the information is fed to block 23 in order to perform inverse prediction for AC and DC components. The output of block 23 is inverse quantized in block 24 and then inverse DCT takes place as a final stage of texture decoding in block 25.

A conventional algorithm for performing a video encoding is shown in FIG. 2. An input frame is processed in block 31, where motion estimation operation is performed. The exact algorithm for motion estimation usually is not standardized, and it is up to a developer to use various methods of motion estimation as long as the output bitstream from block 34 complies with a given standard. The main idea of motion estimation is to find the "best" match between processed block and any block in already encoded and decoded frames, which are stored in block 38. An encoder is supposed to do both encoding and partial decoding in order to perform motion estimation on decoded frames because decoder would have only decoded frames. Hence to avoid drift problems between an encoder and a decoder, any encoder would include decoder operations such as inverse quantization and inverse transform.

The output of block 31 is a delta frame between a current frame and previous frame/frames as well as motion vectors per video frame block. The resultant delta signal is further processed by block 32 applying usually a DCT transform or any similar function. The results of block 32 are quantized in block 33 to further reduce needed bandwidth. Motion vectors and quantized transform values are further encoded losslessly in block 34 that usually performs variable length coding or similar entropy scheme. Block 37 performs rate-control of the whole encoding scheme having a particular output bit rate target and allocating resources for motion estimation and quantization blocks. Various control parameters are transferred from block 37 to block 34 for being multiplexed into the output bitstream. Blocks 35 and 36 are performing partial decoding as described above. Rate-control mechanism in block 37 and motion estimation in block 31 are responsible for video quality given a particular target. There is no awareness of decoder implementation issues such as power dissipation on the encoding stage. The only decoder awareness is a buffer size at the input of decoder, which is normally standardized.

SUMMARY OF THE INVENTION

The present invention provides a technique to add a small primary memory module to a standard decoder, along with a simple memory management scheme, that can substantially decrease the amount of traffic to the secondary, external, memory. A decrease in traffic results in multiple performance benefits: better real-time performance and system power savings. This technique may be used in both standard CPU-based decoders and in dedicated hardware-based ones. Our simulation results show that even simple memory management scheme and relatively small amount of internal processor memory may decrease the traffic between CPU and external memory by about 50%.

The present invention also includes a related technique in which the encoder, given prior knowledge of the decoder's primary memory module management scheme, regulates its choice of predictors to reduce the decoder's secondary memory accesses. The decrease of decoder power as a consequence of encoder awareness of decoder memory management is added to the savings achieved in decoder itself as described above.

The present invention can be implemented in any standard or proprietary encoder scheme producing a compliant output bitstream that is decodable by standard decoders with almost no quality degradation. If decoded on decoders built with the disclosed memory management technique and small internal memory, there is a substantial power saving for the decoder systems.

Often, video decoder is implemented as a part of multimedia player solution, which includes video decoder, audio decoder, parsing or network adaptation layer as well as synchronization between video and audio. Prior art schemes that use various cache strategies for decoder to improve its performance would not be of advantage for the player situation—general CPU cache is used for both audio and video and hence one application can not count on the cache data to be from that particular application earlier run.

Taking the said above into account, the present invention will give substantial benefit for such systems as smart phones, PDAs, portable DVD players, etc.

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

Figure 1:
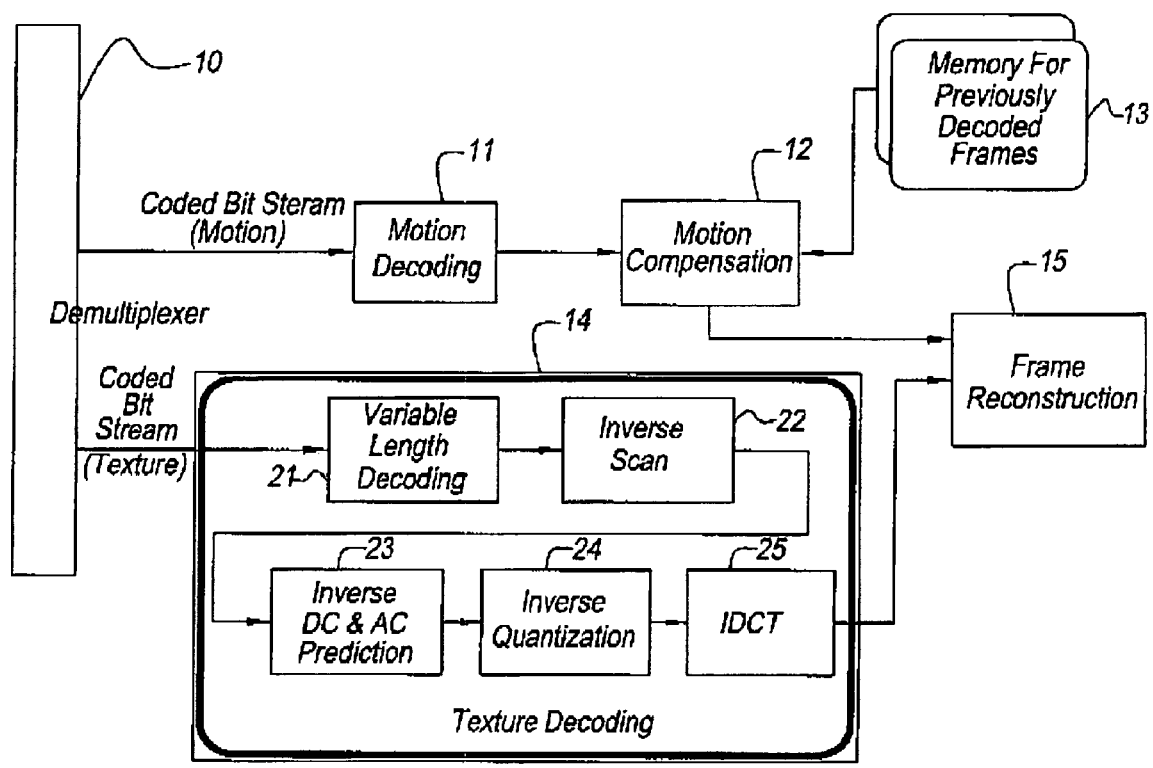
FIG. 1 General video decoding schemes including general texture decoding.
Figure 2:
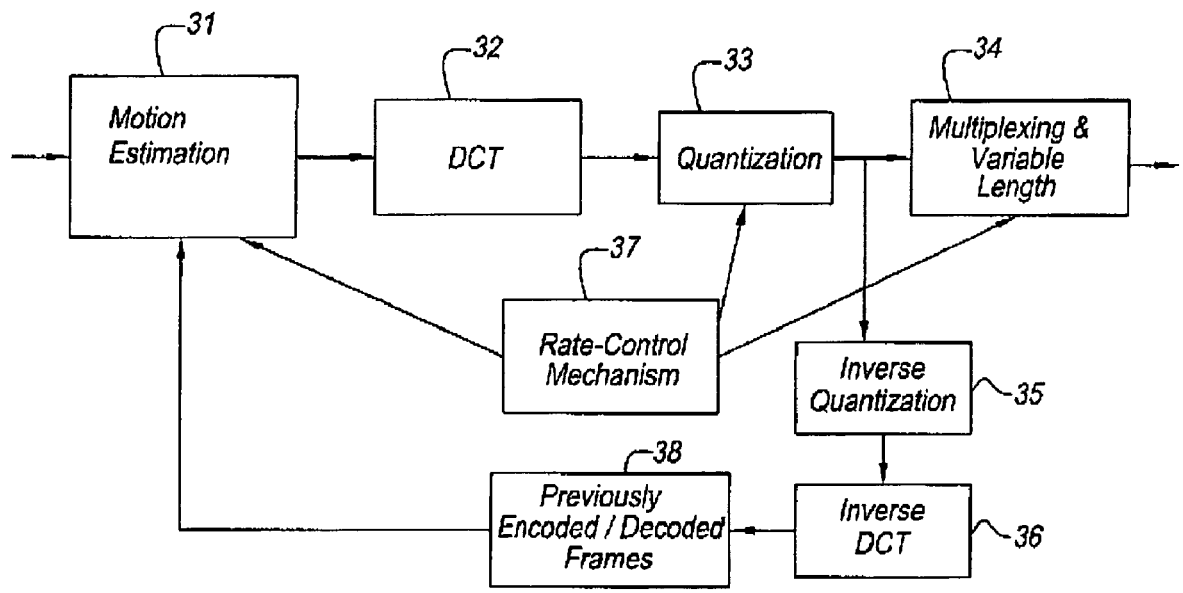
FIG. 2 Conventional algorithm for performing video encoding.
Figures 3A, 3B:
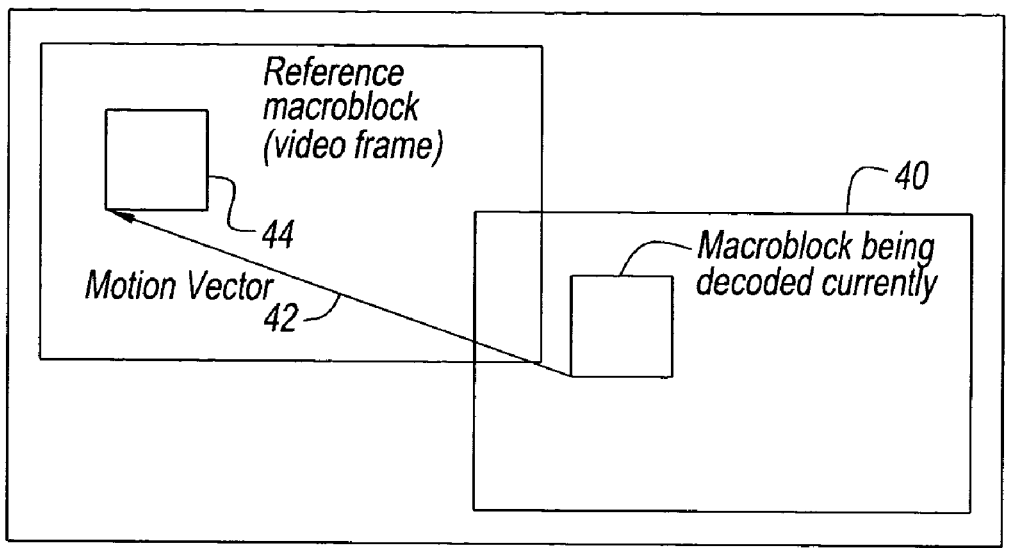
FIG. 3A Motion Compensation elements.
FIG. 3B Video Primary Memory Management using a simple Table.
Figure 3C:
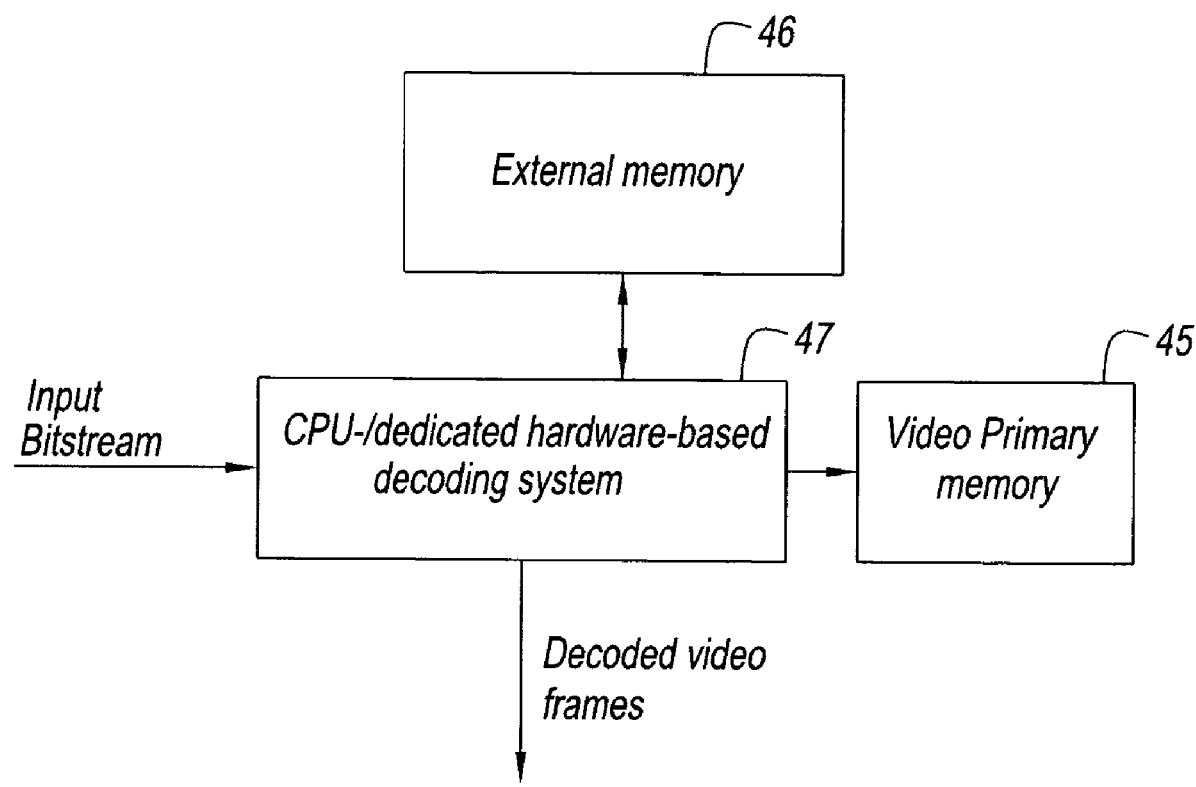
FIG. 3C Video decoding method with video primary memory module.

Referring to FIGS. 3A, 3B and 3C the method of the preferred embodiment will be described. As shown in FIG. 1, block 12 of the prior art, Motion Compensation 12 uses a big amount of external memory for previously decoded frames storage, block 13. The general decoding scheme according to the disclosed method is the same as one of the FIG. 1 prior art. What is different is the way the operation of blocks or modules 12 and 13 is performed. As shown in FIG. 3A, to decode a current macro block 40 we utilize a motion vector 42 to bring into the temporary buffer 44 a reference macro block. This "copy" kind of operation is to be performed for each and every macro block, or more generally, block of video frame (further in the text ((macro) block).

The idea of the disclosed method is to use "internal" or "very close" video primary memory 45 as shown in FIG. 3C. This memory will hold recent (macro) blocks used in the process of motion compensation. The size of the memory 45 is relatively small e.g. for CIF (Common Intermediate Format) resolution 352×288 video source, the memory size is less than 16 Kilobytes and the access time from either a CPU-based system (or dedicated hardware-based), block 47, is very fast. It should be stressed here, that block 45 is not a general cache for the CPU in case of a CPU-based system. One can not use a general cache because video decoding is not the only task that runs on the CPU: there are others, like audio decompression, scheduling, parsing etc. Block 45 is a dedicated video-only fast memory.

It will be appreciated that there exist many methods of a memory management for regulating interactions between blocks 45, 46 and 47. The simplest one is a method based on a table as shown in FIG. 3B. When a first (macro) block is needed for motion compensation, the memory in block 45 is empty. Then the first reference (macro) block is written into video memory of block 45 as well as table of FIG. 3B is updated. First column of the table is (macro) block address, which is a (macro) block serial number. The second column is one bit of information indicating whether a given (macro) block is currently located in the video memory of block 45. The third column is information describing where the given (macro) block is located in the video memory of block 45.

When the second reference (macro) block is needed, the motion compensation routine or engine running in block 47 will check the table of FIG. 3B for the presence of needed (macro) block. If it is already located in the memory of block 45, this (macro) block is taken from memory 45. Otherwise, the reference (macro) block is copied from external memory 46 whereas table of FIG. 3B is updated accordingly. When the video memory in block 45 is full and yet new (macro) blocks are coming, one can use various methods for memory/table management. The simplest one is based on the known principle of first-in-first-out approach. The disclosed method of motion compensation for video decompression algorithms is appropriate for various kinds of predicted pictures. Accessing "close" video memory 45 reduces substantially the traffic between external memory 46 and CPU/dedicated hardware decoding engine 47. Such a reduction leads to a smaller system power dissipation and less real-time needed to perform decoding function in 47. Real-time savings are explained by the fact that "close" video memory 45 is normally faster than external memory 46. Power dissipation savings are explained by the fact that "chip internal" (whether inside CPU-based chip or dedicated hardware one) memory is less power dissipating than the external memory 46.

It is well known that there are two kinds of predicted pictures: P-pictures and B-pictures. P-pictures use one or many previously decoded pictures whereas B-pictures use two or many previous and future pictures.

The disclosed method of the preferred embodiment is applicable for both P- and B-pictures. Also, it should be noted that the disclosed method is appropriate for both luminance and chrominance kinds of data which are comprising a video frame. As follows from the above description, the disclosed method can be used in any standard and proprietary types of video compression, such as MPEG-1, MPEG-2, MPEG-4, H.261, H.263, H.264 etc.

Below we describe one particular example of video encoder algorithm which has decoder-power awareness. In general, the disclosed idea is to provide an encoder of any kind of data, like video, audio, text etc that has decoder-system-power awareness.

Figure 4:
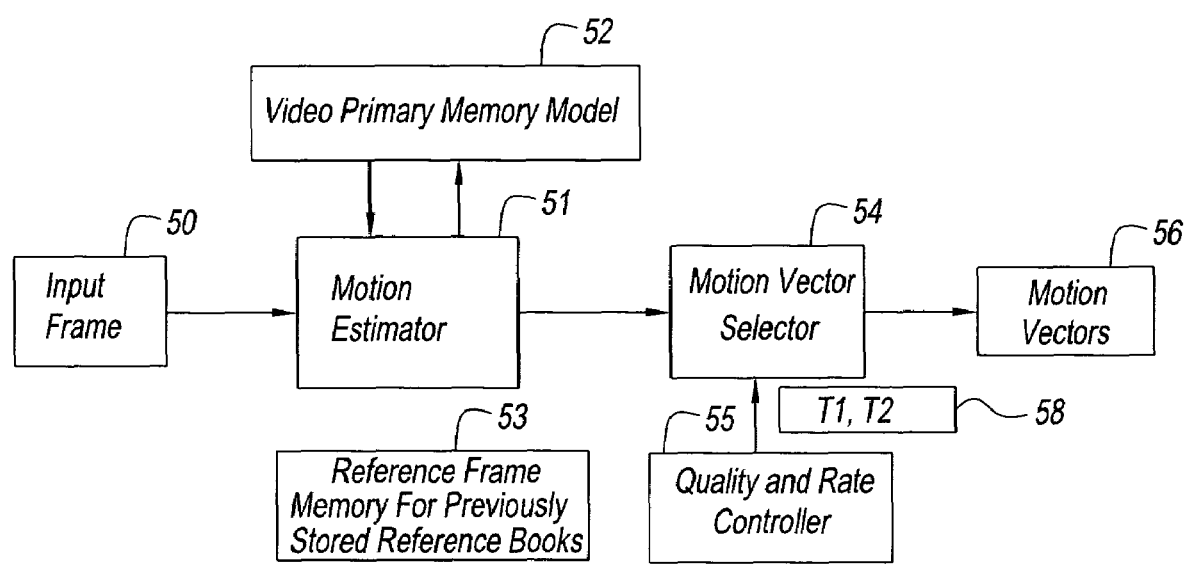
FIG. 4 Motion Estimation with Decoder Video Primary Memory Model and Quality/Rate Controller.

FIG. 4 describes the motion estimation part of the invention, i.e. the encoder side. The motion estimation in the preferred embodiment of the invention consists of the following major function units: the motion estimator 51, the video primary memory model 52, the reference frame memory 53, the motion vector selector 54, and the quality and rate controller 55. The Motion estimator 51 uses a searching algorithm to find the best match between the input macro block and an area in the reference frame 53. The video primary memory model 52 emulates the same operation of the video primary memory in the decoder. The video primary memory model 52 stores the reference blocks or macro blocks that were used in coding the previous macro blocks in the Input Frame 50. When the memory is full, a previous stored reference block will be replaced by the most recently used reference block. The replacement can accord to the first-in first-out (FIFO) rule or any other meaningful rule.

The reference frame memory 53 holds the reference frames for motion estimation purpose. The motion vector selector 54 determines the choice on how to encode the input macro block, i.e., whether to encode its 8×8 blocks in intra mode (without prediction) or inter mode (with motion compensated prediction) and what and how many motion vectors 56. The quality and rate controller 55 determines the thresholds T1 and T2 58 to control the trade off among the reference block reuses, the quality of the best motion estimates, and the bit allocation.

To encode a macro block from the input frame 50, the motion estimator 51 first determines the motion vectors between the given macro block and the best match in the reference frames 53. The motion estimation is done on a macro block by macro block basis by using a search algorithm, such as the block matching algorithm (BMA). A macro block has 16×16 pixels. Each inter-coded macro block can have either one motion vector for the entire macro block, or up to four motion vectors for its four 8×8 blocks or 16 motion vectors for 4×4 blocks or other combinations in between.

In one of the embodiments, to encode a macro block from the input frame 50, the motion estimator 51 first searches the video primary memory model 52 to find the best match candidate among the stored previously used reference blocks. If the difference between the current input macro block and the best match candidate is less than a threshold T1, the motion vector selector 54 may choose this candidate as the best reference and determine the motion vectors 56 using the coordinates of the input macro block and the chosen best match reference. Otherwise the motion estimator 51 will do the normal search on the reference frames to find the best match candidate either in the 16×16 macro block form or as specified above. If the total difference between the input macro block and the best match candidate found in the reference frames 53 is less than the total difference between the input macro block and the best match candidate found in the video primary memory model 52 by more than the threshold T2, then the motion vector selector 54 will choose the best match candidate found in the reference frames 53 as the final choice and determine the motion vectors 56 accordingly. The thresholds T1 and T2 are determined by the quality and rate controller 55. T1 and T2 can be either fixed values or adaptively determined by some functions.

Figure 5:
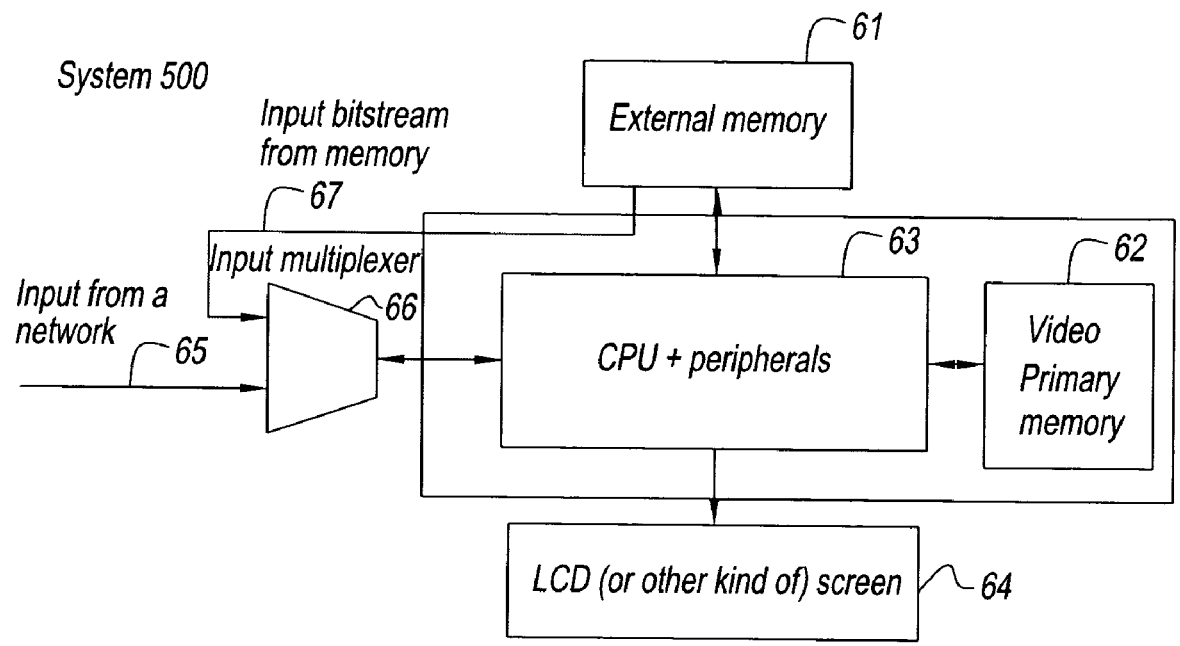
FIG. 5 Video decoding scheme with video primary memory based on CPU.

Referring to FIG. 5, a system 500 for video decoding according to the first embodiment of the present invention will now be described. System 500 may present a base for video decoding function implementation for such multimedia devices as smart phones, PDAs, DVD players, etc. This embodiment of the system and method is built upon CPU-based decoding system.

System 500 includes an external memory 61, CPU+peripherals block 63, video primary memory block 62, display 64 and input multiplexer 66. Physically, blocks 63 and 62 may belong to the same device 60 or may be two distinct blocks. Input file (bitstream) may reside in an external memory 61 and come as signal 67, or come from a network as signal 65. Block 63 will perform all video decoding operations in software including input bitstream demultiplexing, inverse quantization, inverse transform and motion compensation. For the sake of motion compensation function, video primary memory 62 is used as was described above and explained in FIGS. 3A, 3B, 3C. If CPU in 63 has its internal cache memory, such memory would be used for other video decoding functions as well as audio decoding, parsing etc.

Thus, those skilled in the art will understand and appreciate that the main idea here is: memory 62 is completely dedicated to the motion compensation function of video decoding, and is no way contaminated by other kinds of information. Decoded frames are displayed in the output display/screen 64. Accessing "close" video primary memory 62 substantially reduces the traffic between external memory 61 and CPU block 63. Such a reduction leads to smaller power dissipation and less real-time needed for performing a video decoding in 63. Real-time savings are explained by the fact that "close" video primary memory 62 is normally faster than the external memory 61. Power dissipation savings are explained by the fact that "chip internal" memory 62 is less power dissipating than the external memory 61—chip being block 60.

Figure 6:
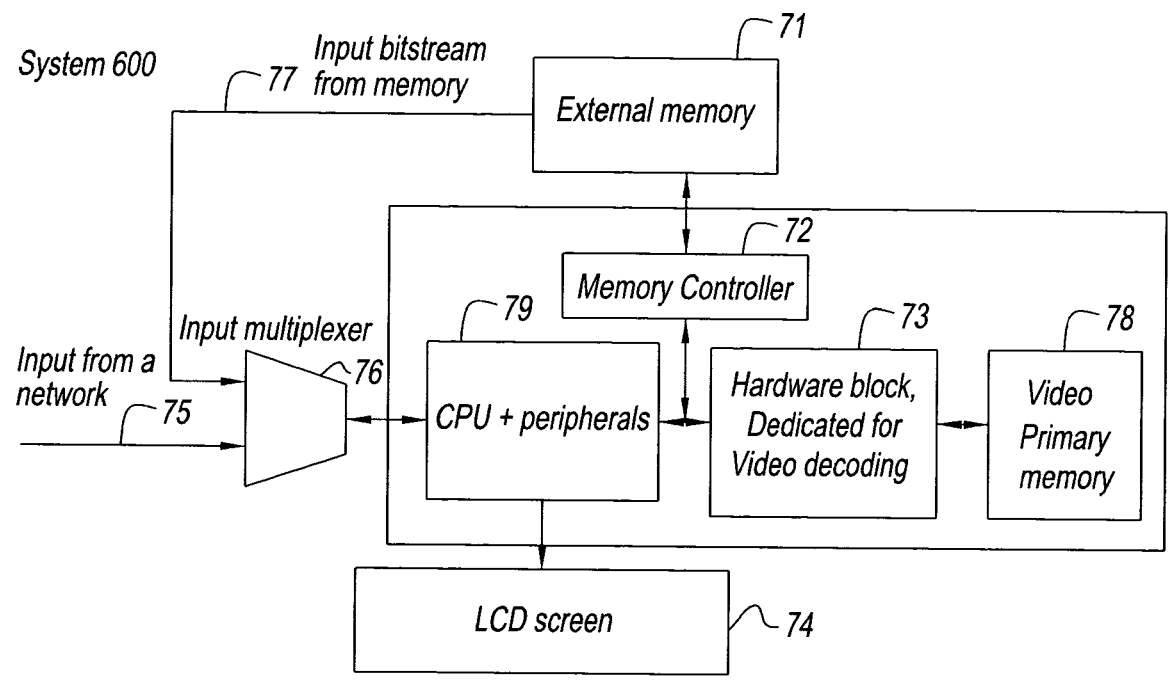
FIG. 6 Video decoding scheme with video primary memory based dedicated hardware.

Referring to FIG. 6, a system 600 for video decoding according to the second embodiment of the present invention will now be described. System 600 may present a base for video decoding function implementation for such multimedia devices as smart phones, PDAs, DVD players etc. This second embodiment of the disclosed system and method is built upon dedicated hardware decoding system.

System 600 includes an external memory 71, CPU+peripherals block 79, video primary memory block 78, display 74, memory controller 72, dedicated hardware for video decoding 73 and input multiplexer 76. Physically, blocks 79, 78, 73 and 72 may belong the same device 70 or may be distinct blocks. Input file (bitstream) may reside in the external memory 71 and come either as signal 77 from 71 or come from a network as signal 75. Blocks 79, 73 and 78 will perform all video decoding operations in software and dedicated hardware including input bitstream demultiplexing, inverse quantization, inverse transform and motion compensation. For the sake of motion compensation function which is performed in block 73, video primary memory 78 is used as was described above and explained in FIGS. 3A, 3B, 3C. If CPU in 79 has its internal cache memory, such memory would be used for other video decoding functions as well as audio decoding, parsing etc.

The main idea here—as was the case before with memory 62—is that memory 78 is dedicated to motion compensation function of the video decoding and is not contaminated by other kinds of information. Decoded frames are displayed in the output display/screen 74. Accessing "close" video primary memory 78 substantially reduces the traffic between the external memory 71 and block 73. Such a reduction leads to smaller power dissipation and less real-time needed for performing video decoding functions, such as motion compensation, in 73. Real-time savings are explained by the fact that "close" video primary memory 78 is normally faster than the external memory 71. Power dissipation savings are explained by the fact that "chip internal" memory 78 is less power dissipating than the external memory 71—chip being block 70.

Referring again to FIG. 6 of the drawings, a further embodiment involving a power-sensitive compression process for decoding a predictively encoded data stream, the process comprises generating a first selection signal, which signals whether the data to be used for prediction resides in primary memory in part or in whole. If the first selection signal from the primary memory 78 indicates that a portion of the prediction data or the whole of such prediction data is not present in primary memory, then there is generated a second selection signal based on an estimate of the future needs of the prediction process, which signals to the primary memory 78 where the prediction data, which is already present in that memory, should reside. This is followed by transferring a prediction data not already present in primary memory 78 from secondary (external) memory 71 to that portion of the primary memory indicated by the second selection signal. Beyond this a prediction signal is generated for use in the process of decompression by manipulating data residing in primary memory 78.

In connection with the methods of decoding data streams of this invention, computer programs are suitably provided on media, such as disks and the like, for directing the processor means described herein so as to control, via the external memory and high speed primary memory, the effectuation of such methods.

The invention having been thus described with particular reference to the preferred forms thereof, it will be obvious that various changes and modifications may be made therein without departing from the spirit and scope of the invention as defined in the appended claims.

What is claimed is:

1. A decoding power aware encoding method that is executable in an encoding system, said method comprising:
 generating a predictively encoded data stream, in which predictions, that result in a reduction in the amount of reference data transferred from a secondary memory to a primary memory of a decoder during a decoding process, are favored, wherein said generating step comprises:
 (a) providing a primary memory model that emulates an operation of transferring and keeping a part of said reference data from said decoder secondary memory to said decoder primary memory in the decoding process;
 (b) finding at least one candidate that is a match between a current block of an input data sequence and said reference data located in said primary memory model;
 (c) assigning quality and rate measures to each said candidate; and
 (d) based on said assigned measures, choosing a particular one of the candidates to reduce accesses to said decoder secondary memory, thereby achieving said reduction in the amount of reference data transferred from said decoder secondary memory wherein said choosing step chooses said candidate if a difference between said current block and said candidate is less than a first quality and rate measure; and
 wherein if said difference is greater than said first quality and rate measure, said finding step further searches a second memory, which stores reference data without regard for said decoding process, for at least one other candidate that is a match with said current block, and wherein said choosing step chooses said other candidate if a total difference between said current block and said candidate found in said primary memory by more than a second quality and rate measure.

2. A system for encoding an input bit frame comprising:
 (a) a primary memory model that emulates an operation of a primary memory in a decoder and that stores a part of previously used reference data according to a decoding process;
 (b) a motion estimator that receives a current block of an input video data sequence to be encoded and searches said primary memory model to find at least one candidate as a match between said current block and said reference data;
 (c) said primary memory model being coupled to said motion estimator;

(d) a motion vector selector that is coupled to an output of the motion estimator and that chooses said candidate as a predictor of said current block accordingly; and (e) a quality and rate controller that provides quality and rate measures for each candidate to the motion vector selector wherein said motion vector selector chooses said candidate if a difference between said input block and said candidate is less than a first quality and rate measure, and wherein if said difference is greater than said first quality and rate measure, said motion estimator searches a second memory, which stores reference data without regard for said decoding process, for a second match with said current block, and wherein said motion vector selector chooses said other candidate if a total difference between said input block and said other candidate is less than a total difference between the input block and the candidate found in said primary memory by more than a second quality and rate measure.

3. A system for encoding a data frame as defined in claim 2, further comprising a motion vectors module for determining the motion vectors based on a current block and said match.

* * * * *